United States Patent
Bickert et al.

(10) Patent No.: US 6,281,288 B1
(45) Date of Patent: *Aug. 28, 2001

(54) REINFORCED MOLDING MATERIAL

(75) Inventors: Peter Bickert, Atlanta, GA (US); Ralf Laven, Schwoerstadt; Hans Guenther Wey, Muelheim, both of (DE)

(73) Assignee: Degussa-Huels Aktiengesellschaft, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,192

(22) Filed: Mar. 3, 1999

(30) Foreign Application Priority Data

Mar. 3, 1998 (DE) .............................. 198 088 88

(51) Int. Cl.$^7$ ..................................... C08G 63/91
(52) U.S. Cl. ................ 525/72; 525/288; 525/383; 524/504; 524/858; 524/855; 524/881
(58) Field of Search ..................... 525/288, 383, 525/72; 524/855, 881, 858, 504

(56) References Cited

U.S. PATENT DOCUMENTS

| | | | |
|---|---|---|---|
| 3,306,874 | 2/1967 | Hay | 528/215 |
| 3,306,875 | 2/1967 | Hay | 528/215 |
| 4,818,789 | 4/1989 | Tomko et al. | 525/64 |
| 5,241,014 | * 8/1993 | Kehs et al. | 525/376 |
| 5,994,474 | * 11/1999 | Wey et al. | 525/288 |

FOREIGN PATENT DOCUMENTS

| | | | |
|---|---|---|---|
| 510559 | * 10/1992 | (EP) | . |
| 0 510 559 | 10/1992 | (EP) | . |
| 2 249 550 | 5/1992 | (GB) | . |
| 9706731 | * 3/1998 | (MX) | . |

OTHER PUBLICATIONS

Abstract (2pp.) EP 122,394, Oct. 24, 1984.
Abstract (1p.) JP 58–217,532, Dec. 17, 1983.
Abstract (1p). JP 54–064–545, May 24th, 1979.

* cited by examiner

*Primary Examiner*—Rachel Gorr
(74) *Attorney, Agent, or Firm*—Oblon, Spivak, McClelland, Maier & Neustadt, P.C.

(57) ABSTRACT

A reinforced molding material having high tensile strength comprising:

(a) from 0 to 98 parts by weight of one or more thermoplastics, (b) from 2 to 100 parts by weight of a substantially amorphous polyolefin which has been subjected to free radical grafting with a silane which has at least one olefinic double bond and one to three alkoxy groups bonded directly to the silicon, this grafted polyolefin having a melt viscosity at 190° C. In the range from 100 to 50,000 maps and the parts by weight of (a) and (b) sunning to 100, and (c) from 0.5 to 400 parts by weight of a reinforcing material. The molding material can be used, inter alia, for shaped articles, as hotmelt adhesives or for heavy-duty carpet backing materials.

28 Claims, No Drawings

REINFORCED MOLDING MATERIAL

BACKGROUND OF THE INVENTION

1. Field of the Invention

The invention relates to a reinforced molding material which contains a filler or a fibrous reinforcing material and a silane-grafted polyolefin.

2. Discussion of the Background

The reinforcement of thermoplastics by means of a filler or of a fibrous reinforcing material such as, for example, glass fibers, has long been part of the prior art. By means of this measure, the modulus of elasticity can be very effectively increased but the fracture behavior is often unsatisfactory, which is manifest, for example, in substantially reduced impact strength. In these cases, it was found that there is only poor binding or no binding at all between polymer matrix and reinforcing material. The tensile strength, too, is greatly dependent on the binding so that the full potential of this material combination can be utilized only in the case of strong interphase adhesion. This problem is encountered in particular in the case of molding materials based on polyolefins or polyesters.

One possibility for increasing the interphase adhesion between polymer matrix and reinforcing material is the use of a size. Although extensive work in this context has long been known, the result is still unsatisfactory in many cases, especially since the sizing of the reinforcing material constitutes an additional complication in the process.

Japanese patent application JP-A-58217532 states that glass fiber-reinforced polyolefin molding materials having excellent mechanical properties are obtained if a polyolefin is used which was subjected to free radical grafting with an aliphatically unsaturated trialkoxysilane.

Over and above the fact that this implies limitation to polyolefin molding materials, this method also has some disadvantages which prevent its use. On the one hand, the total matrix material is in fact remelted and is functionalized during this procedure, which gives rise to considerable additional process costs. In particular, a substantial amount of the expensive silane must be used, the unconverted proportion having to be removed subsequently. In addition, undesired changes in the melt viscosity result, free radical degradation taking place in the case of polypropylene and free radical synthesis in the case of polyethylene. In addition, the fact that the incorporation of glass fibers into a highly viscous polymer melt requires high shear forces is a general disadvantage, which may lead to a decrease in the molecular weight in the case of a matrix- in particular, however, this leads to considerable mechanical comminution of the fibers and hence to a deterioration in the mechanical properties. In general, establishing a desired specification in a controlled manner is virtually impossible in this way.

Japanese patent application JP-A-54064545 describes molding materials which contain a) 100 parts by weight of polyolefin,
b) from 2 to 100 parts by weight of a polymer in which a silane, for example, vinyltrimethoxysilane, has been grafted onto polyethylene, a copolymer based on ethylene or a halogenated polymer derived therefrom, and
c) from 10 to 25 parts by weight of a reinforcing material.

Here too, the incorporation of the reinforcing material into the highly viscous polymer melt is problematic.

A further, very specific molding material which consists of many components and contains a silane-modified polypropylene is described in German Offenlegungsschrift 41 36 687.

SUMMARY OF THE INVENTION

It was an object of the present invention to provide reinforced molding materials which have a higher tensile strength and improved impact strength and in the preparation of which unsized reinforcing materials can be used. According to a further object, it should be possible further to increase the heat deflection temperature of such molding materials. Furthermore, the reinforced molding materials should be capable of being prepared by a simplified process, it being possible to establish desired specifications in a controlled manner.

This object is achieved by a molding material which comprises:

(a) from 0 to 98 parts by weight of one or more thermoplastics,
(b) from 2 to 100 parts by weight of a substantially amorphous polyolefin which has been subjected to free radical grafting with a silane which has at least one olefinic double bond and one to three alkoxy groups bonded directly to the silicon, this grafted polyolefin having a melt viscosity at 190° C. in the range from 100 to 50,000 mPas, measured on the basis of DIN 53 019 in a rotational viscometer at a shear rate of 30.5 s$^{-1}$, the parts by weight of (a) and (b) summing to 100, and
(c) from 0.5 to 400 parts by weight of a reinforcing material, with the exception of those molding materials in which less than 28 parts by weight of barite are used as reinforcing material.

DETAILED DESCRIPTION OF THE PREFERRED EMBODIMENTS

The thermoplastic (component (a)) may be, for example, a polyolefin, a polystyrene, a polyphenylene ether, a polycondensate, such as polyester or polyamide, a polyurethane and/or a rubber.

Suitable polyolefins are in principle any polyolefin of the prior art, for example polyethylene, polypropylene and poly-1-butene, as well as copolymers of ethene, propene or 1-butene, either as a random copolymer, such as, for example LLDPE or propene/ethene random copolymers containing about 1–15% by weight of ethene, or as block copolymers such as, for example, propenelethene block copolymers. The polyolefin may also be a substantially amorphous polyolefin, as may be used as a grafting base for the component (b). The polyolefin may also contain a rubber as an impact modifier, for example ethene/propene rubber (EPM) or ethene/propene/diene rubber (EPDM). All these polymers are well known to a person skilled in the art, making further description superfluous.

The polystyrene can be used either as such or in rubber-modified form, the choice of the rubber, for example butadiene rubber (BR), EPDM, styrene/butadiene/styrene block copolymers (SBS) or polyoctenamer (TOR), being uncritical. The polystyrene may be present as a homopolymer; however, in order to increase the heat deflection temperature, it may also contain comonomers, such as α-methylstyrene, acrylonitrile, methyl methacrylate or N-phenylmaleimide, as polymerized units.

The polyphenylene ethers are formed by oxidative coupling of 2,6-dialkylphenols; they are described, for example, in U.S. Pat. Nos. 3,306,874 and 3,306,875 and in EP-A-0 122 394. Usually, they are used as a polymer blend with polystyrene.

Suitable polyesters are, for example, polyethylene terephthalate, polybutylene terephthalate or copolyesters which contain 1,4-cyclohexanedimethanol as a comonomer.

The polyamide (PA) used may be of any available type, for example PA 46, PA 6, PA 66, PA 612, PA 1010, PA 1012, PA 11, PA 12, PA 1212 or PA 6,3 T. These types need not be explained in more detail to a person skilled in the art.

Suitable polyurethanes are those which can be processed by a thermoplastic method, the type of monomers used being uncritical.

For example, the following may be mentioned as a suitable rubber: EPM, EPDM, SBS, hydrogenated styrenelbutadiene/styrene block polymers (SEBS), SIS, styrene/butadiene rubber (SBR), butadiene rubber (BR), silicone rubber, natural rubber (NR), butyl rubber and chloroprene rubber. A person skilled in the art knows that such rubbers may be present in the rubber compounds as mixtures with a plurality of rubber types, the compounds usually also containing plasticizer oils, vulcanizing agents and optionally vulcanization accelerators, in addition to fillers.

Generally preferred thermoplastics are those which are semicrystalline.

Furthermore, polyolefins are preferred owing to the good compatibility with the component (b).

The molding material contains preferably from 1 to 97 parts by weight, particularly preferably from 10 to 96 parts by weight and very particularly preferably from 20 to 95 parts by weight of the thermoplastic or thermoplastics.

For example, atactic polypropylene, atactic poly-1-butene, ethene/propene copolymers, ethene/1-butene copolymers, ethene/propene/1-butene terpolymers, propene/1-butene copolymers, ethene/propene/1-hexene terpolymers, ethene/propene/1-octene terpolymers, ethene/1-butene/1-hexene terpolymers, ethene/1-butene/1-octene terpolymers, ethene/1-hexene/1-octene terpolymers, propene/1-butene/1-hexene terpolymers, propene/1-butene/1-octene terpolymers or propene/1-hexene/1-octene terpolymers may be used as substantially amorphous polyolefin of component (b).

A substantially amorphous polyolefin having the following monomer composition is preferably used here:

from 0 to 95% by weight of an α-olefin having 4 to 10 carbon atoms;

from 5 to 100% by weight of propene and from 0 to 50% by weight of ethene.

The substantially amorphous polyolefin particularly preferably has the composition:

from 3 to 95% by weight of an α-olefin having 4 to 10 carbon atoms, from 5 to 97% by weight of propene and from 0 to 20% by weight of ethene.

The α-olefin having 4 to 10 carbon atoms is in particular 1-butene, 1-hexene or 1-octene.

The preparation of such copolymers or terpolymers is described, inter alia, in EP-A-0 023 249; they are commercially available, for example under the name VESTOPLAST. Corresponding types are usually completely or substantially amorphous.

The crystalline fraction can be assessed, for example, by determining the enthalpy of fusion by means of the DSC method. Here, a weighed sample is first heated from −100° C. to +210° C. at a heating rate of 10° C./min and then cooled again to −100° C. at a rate of 10° C./min. After the thermal history of the sample has been eliminated in this manner, heating is once again effected at a rate of 10° C./min to 210° C. and the enthalpy of fusion of the sample is determined by integration of the melting peak which is due to the crystalline melting point $T_m$. For the purposes of the invention, the enthalpy of fusion of the substantially amorphous polyolefin is not more than 100 J/g, preferably not more than 60 J/g and particularly preferably not more than 30 J/g.

The silane to be grafted on preferably has three alkoxy groups directly bonded to the silicon. Vinyltrimethoxysilane (VTMO), vinyltriethoxysilane, vinyltris(2-methoxy-ethoxy)silane, 3-methacryloyloxypropyltrimethoxysilane [MEMO; $H_2C=C(CH_3)COO(CH_2)_3-Si(OCH_3)_3$], 3-methacryloyloxypropyltriethoxysilane, vinyldimethylmethoxysilane or vinylethyldibutoxysilane may be mentioned by way of example. The silane is usually used in the grafting in amounts of from 0.1 to 10% by weight, preferably from 0.5 to 5% by weight, based on the polyolefin.

The unsaturated silane can be grafted onto the substantially amorphous polyolefin by conventional methods known to those of ordinary skill in the art, for example in solution or, preferably, in the melt, a free radical donor being used in a sufficient amount. A suitable procedure is described in German Offenlegungsschrift 4 000 695.

The grafted, substantially amorphous polyolefin preferably has a melt viscosity in the range from 1,000 to 30,000 mPas.

The reinforcing material may be either a filler, for example, alumina, talc, barite, clay powder, silica, carbon black, calcium carbonate, titanium dioxide, mica, kaolinite, glass flakes, kieselguhr or glass beads, or a fibrous reinforcing material, such as glass fibers, carbon fibers or single crystal filaments. Mixtures of such fillers can of course also be used.

The molding material preferably contains from 4 to 200 and particularly preferably from 8 to 100 parts by weight of the reinforcing material. It is also preferred if the molding material contains either a fibrous reinforcing material or at least 28 parts by weight of a filler. In addition, it is preferred if the molding material contains at least 28 parts by weight of a reinforcing material.

The molding material according to the invention can be prepared by customary methods, known to those of ordinary skill in the art. First, the substantially amorphous polyolefin can be grafted with the unsaturated silane as stated above and then all components can be mixed simultaneously in a kneader or extruder, for example a twin-extruder. An improved variant comprises grafting the substantially amorphous polyolefin in a side extruder and metering it into the melt of the thermoplastic or thermoplastics. The reinforcing material is then metered in at the same point or downstream and thoroughly mixed in.

It is particularly advantageous if the substantially amorphous polyolefin is first grafted in the front zone of an extruder and the reinforcing material is then incorporated into the melt. However, it is also possible first to incorporate the reinforcing material into the melt of the substantially amorphous polyolefin and then to carry out the grafting by metering in the unsaturated silane and a free radical donor. In both cases, the resulting reinforced and grafted, substantially amorphous polyolefin can be either extruded and initially granulated for further mixing as a masterbatch with the thermoplastic (component (a)) or processed by injection molding or extrusion to give shaped articles or metered as a melt into the melt of one or more thermoplastics (component (b)), for example polypropylene.

The grafted, substantially amorphous polyolefin can then be crosslinked in the mixture with the reinforcing material and optionally thermoplastic, which is most simply achieved by the action of water. Depending on the user's requirements, this is effected by means of water vapor from the surrounding air, by water vapor which is contained in a gas stream, by steam or hot water treatment or by water which is contained in the thermoplastic (in particular in the case of polyamides; to a limited extent also in the case of polyesters). This crosslinking can be carried out on the shaped article; however, it is also possible to effect the crosslinking in the melt or in the granules, in particular to prepare highly viscous molding materials suitable for extrusion.

The crosslinking imparts a higher heat deflection temperature and even further improved tensile strength to the molding material; moreover, the phase morphology is stabilized so that no disadvantageous changes in the properties occur on further processing by a thermoplastic method.

In the present invention, the fact that this crosslinking can be carried out more rapidly than when semicrystalline silane-grafted polyolefins are used according to the prior art has surprisingly proven an additional advantage compared with the prior art. One possible explanation for this might be that the groups capable of crosslinking are present very substantially in the amorphous phase and, since the glass transition temperature of this amorphous phase is as a rule substantially below room temperature, are sufficiently mobile to be able to interact with one another.

To increase the crosslinking rate, a crosslinking accelerator, usually an organotin compound, such as, for example, dibutyltin dilaurate, can be added to the molding material. It may be added either in pure form or, for a better meterability, in the form of a masterbatch. The accelerator may be added prior to melting in the form of a "dry blend" or after melting. Contents from 0.001 to 20% by weight, preferably from 0.01 to 5% by weight, in the masterbatch have proven suitable, so that the molding material then contains from about 0.0001 to 1% by weight of crosslinking accelerator.

On the other hand, the crosslinking rate can, if desired, be reduced by adding ungrafted, readily hydrolyzing silanes, such as hexadecyltrimethoxysilane or hexadecyltriethoxysilane. The water diffusing into the molding material is at least partly taken up by the silanes, so that it takes longer for the water required for crosslinking the silane-grafted polyolefin to be available in the molding material. For this purpose, it is advisable to use silanes having long-chain alkyl radicals, since these do not evaporate during melting of the products and are thus not lost as active ingredient and moreover give rise to no disposable and work safety problems.

Whether the use of crosslinking accelerators or crosslinking inhibitors is required for one of the desired applications can readily be determined by a skilled worker himself on the basis of a few exploratory experiments.

The extremely strong adhesion of the silane-grafted polyolefins to polar surfaces in general and to surfaces carrying OH groups in particular leads to a substantially improved bonding of the thermoplastic matrix to fillers of every type, in particular to glass fibers. In addition, the low melt viscosity of the mixture and in particular the good flow properties of the grafted, substantially amorphous polyolefin lead to improved wetting of the substrate. Both result in a great improvement of the tensile strength.

A further advantage of the invention is that fibrous or lamellar reinforcing materials are protected during incorporation, owing to the low melt viscosity of the mixture. This leads to improved anisotropy of the mechanical properties, such as modulus of elasticity and tensile strength.

The good compatibility between the thermoplastic (a) and the silane-grafted polyolefin (b) is another reason for the resulting good mechanical properties. If the thermoplastic (a) is a polyolefin, a structural similarity is present. If, on the other hand, the thermoplastic (a) is a polycondensate, sufficient compatibility results from the reaction of the grafted-on alkoxysilane groups with functional groups such as —OH, —NH$_2$ and —COOH, which are contained as terminal groups in the polycondensate.

With a higher content of component (a), the molding material according to the invention is used primarily for the production of shaped articles.

With a low content thereof or in the absence of the component (a), the molding material according to the invention can advantageously be used for heavy-duty carpet backing materials, which may be crosslinked, or for similar applications or as hotmelt adhesives where a particular strength of the adhesive joint is required. Here, the tendency to creep ("cold flow") can be effectively suppressed by the crosslinking.

In the absence of the component (a), the molding material can moreover be used as a masterbatch for the preparation of reinforced thermoplastics according to the invention.

Having generally described this invention, a further understanding can be obtained by reference to certain specific examples which are provided herein for purposes of illustration only and are not intended to be limiting unless otherwise specified.

EXAMPLE 1

For the preparation of a silane-grafted polyolefin, a substantially amorphous poly-α-olefin having the following monomer composition was used:

6% by weight of ethene

64% by weight of propene

30% by weight of 1-butene.

In a twin-screw extruder (Berstorff ZE 40), a mixture consisting of 92.9% by weight of this poly-α-olefin, 6.0% by weight of vinyltrimethoxysilane (DYNASYLAN® VTMO) and 1.1% by weight of dicumyl peroxide was mixed in the absence of air and moisture at a temperature of about 170° C. and kept at this temperature for a residence time of about 90 s. The excess VTMO was evaporated in the final zone of the extruder under a vacuum of about 20 mbar and was condensed in cold traps. The product was stabilized by the addition of IRGANOX® 1076. Its melt viscosity at 190° C. was 6,000 mPas.

EXAMPLE 2

The product from Example 1 was melted at 180° C. in a nitrogen atmosphere, 95 parts by weight thereof were mixed with 5 parts by weight of glass fibers (Owens Corning CS 429 YZ; heated beforehand to 550° C. for about 1 h for desizing) and 0.2 part by weight of a phenolic stabilizer (IRGANOX® 1076) in a laboratory kneader for 15 minutes at about 180° C. Suitable test specimens for measuring the tensile strength according to DIN 53455 (bar 4) were produced from this mixture and were tested after various storage times. The results of these measurements are shown in Table 1.

EXAMPLE 3

The product from Example 1 was melted at 180° C. in a nitrogen atmosphere 95 parts by weight thereof, 5 parts by weight of an accelerator in the form of a masterbatch comprising 98% by weight of an amorphous poly-α-olefin (VESTOPLAST® 708) and 2% by weight of dibutyltin dilaurate and 5 parts by weight of glass fibers and 0.2 part by weight of a phenolic stabilizer (IRGANOX® 1076) were introduced in succession into a laboratory kneader and mixed as in Example 2. Suitable test specimens for measuring the tensile strength according to DIN 53455 (bar 4) were produced from this mixture and were tested after various storage times. The results of these measurements are shown in Table 1.

EXAMPLE 4 (not according to the invention)

Here, instead of the product from Example 1, the unfimetionalized amorphous poly-α-olefin VESTOPLAST® 708, which is very substantially comparable with the product from Example 1 with respect to the monomer composition of the hydrocarbon chain and the melt viscosity, was used.

VESTOPLAST® 708 was melted at 180° C. in a nitrogen atmosphere. 95 parts by weight thereof were mixed with 5 parts by weight of glass fibers (as in Example 2) and 0.2 part by weight of IRGANOX® 1076 in a laboratory kneader as in Example 2. The further procedure was then as in Example 2. The results of the measurements are shown in Table 1.

TABLE 1

|  |  | Example 2 | Example 3 | Example 4 (not according to the invention) |
|---|---|---|---|---|
| Product from Example 1 | Parts | 95 | 95 | — |
| Accelerator masterbatch | Parts | — | 5 | — |
| VESTOPLAST ® 708 | Parts | — | — | 95 |
| Glass Fibers | Parts | 5 | 5 | 5 |
| IRGANOX ® 1076 |  | 0.2 | 0.2 | 0.2 |
| Tensile test based on DIN 53455, bar 4 | | | | |
| Tensile strength after storage time of 1 week | N/mm² | 3.7 | 3.7 | 1.6 |
| Tensile strength after storage time of 2 weeks | N/mm² | 4.2 | 5.4 | 1.6 |
| Tensile strength after storage time of 4 weeks | N/mm² | 4.6 | 5.7 | 1.7 |

EXAMPLE 5 (not according to the invention)

50 parts by weight of VESTOPLAST® 708 as a melt were mixed with 50 parts by weight of barite (barite powder CH 1177 from Sachtleben) and 0.2 part by weight of IRGANOX® 1010, a stabilizer to prevent thermal degradation, at 180° C. under a nitrogen atmosphere in a laboratory kneader. Suitable test specimens for measuring the tensile strength and the elongation at break according to DIN 53455 (bar 4) were produced from this mixture and were tested after various storage times. The results of these measurements are shown in Table 2.

EXAMPLE 6

Analogous to Example 5, with the only difference being that the product from Example 1 was used instead of VESTOPLAST® 708. The results are shown in Table 2.

EXAMPLE 7 (not according to the invention)

Analogous to Example 5, with the only difference being that a calcite (Mianit 0–30 from Eanström Mineral) was used instead of barite. The results are shown in Table 2.

EXAMPLE 8

Analogous to Example 7, with the only difference being that the product from Example 1 was used instead of VESTOPLAST® 708. The results are shown in Table 2.

TABLE 2

|  |  | Example 5 (not according to the invention) | Example 6 | Example 7 (not according to the invention) | Example 8 |
|---|---|---|---|---|---|
| VESTOPLAST ® 708 | Parts | 50 | 0 | 50 | — |
| Product from Example 1 | Parts | — | 50 | — | 50 |
| Barite | Parts | 50 | 50 | — | — |
| Calcite | Parts | — | — | 50 | 50 |
| IRGANOX ® 1010 | parts | 0.2 | 0.2 | 0.2 | 0.2 |
| after | | Tensile Strength | | | |
| 1st day | N/mm² | 0.92 | 1.23 | a) | 1.22 |
| 2nd day | N/mm² | a) | a) | 0.97 | a) |
| 3rd day | N/mm² | 0.96 | 1.21 | a) | 1.33 |
| 4th day | N/mm² | a) | a) | a) | a) |
| 5th day | N/mm² | a) | a) | 1.05 | a) |
| 1st week | N/mm² | 1 | 1.4 | 1.11 | 1.6 |
| 2nd week | N/mm² | 1.05 | 1.6 | 1.21 | 1.69 |
| 4th week | N/mm² | a) | 1.78 | a) | 1.89 |
| 10th week | N/mm² | a) | 2.26 | a) | 2.39 |
| after | | Elongation at break | | | |
| 1st day | % | 105 | 227 | a) | 167 |
| 2nd day | % | a) | a) | 61 | a) |
| 3rd day | % | 81 | 186 | a) | 134 |
| 4th day | % | a) | a) | a) | a) |
| 5th day | % | a) | a) | 56 | a) |
| 1st week | % | 70 | 200 | 49 | 189 |
| 2nd week | % | 64 | 226 | 42 | 207 |
| 4th week | % | a) | 265 | a) | 259 |
| 10th week | % | a) | 297 | a) | 192 |

Obviously, numerous modifications and variations of the present invention are possible in light of the above teachings. It is therefore to be understood that within the scope of the appended claims, the invention may be practiced otherwise than as specifically described herein.

This application is based on German patent application 19808888.4 filed in the German Patent Office on Mar. 3, 1998, the entire contents of which are hereby incorporated by reference.

What is claimed is:

1. A molding material which comprises:
   (a) from 0 to 98 parts by weight of one or more thermoplastics,
   (b) from 2 to 100 parts by weight of a grafted, substantially amorphous polyolefin of a substantially amorphous polyolefin which has been subjected to free radical grafting with a silane which has at least one olefinic double bond and one to three alkoxy groups bonded directly to the silicon, wherein said grafted, substantially amorphous polyolefin has a melt viscosity at 190° C. in the range from 100 to 50,000 mPas and the parts by weight of (a) and (b) summing to 100, and (c) from 0.5 to 400 parts by weight of a reinforcing material, with the exception of those molding materials in which less than 28 parts by weight of barite are used as reinforcing material.

2. The molding material as claimed in claim 1, which comprises from 1 to 97 parts by weight of said thermoplastics.

3. The molding material as claimed in claim 1, which comprises from 10 to 96 parts by weight of said thermoplastics.

4. The molding material as claimed in claim 1, which comprises from 20 to 95 parts by weight of said thermoplastics.

5. The molding material as claimed in claim 1, wherein said thermoplastic is selected from the group consisting of a polyolefin, a polystyrene, a polyphenylene ether, a polycondensate, a polyurethane, a rubber and a mixture thereof.

6. The molding material as claimed in claim 1, wherein said substantially amorphous polyolefin is selected from the group consisting of an atactic polypropylene, an atactic poly-1-butene, an ethene/propene copolymer, an ethene/1-butene copolymer, an ethene/propene/1-butene terpolymer, a propene/1-butene copolymer, an ethene/propene/1-hexene terpolymer, an ethene/propene/1-octene terpolymer, an ethene/1-butene/1-hexene terpolymer, an ethene/1-butene/1-octene terpolymer, an ethene/1-hexene/1-octene terpolymer, a propene/1-butene/1-hexene terpolymer, a propene/1-butene/1-octene terpolymer, a propene/1-hexene/1-octene terpolymer and a mixture thereof.

7. The molding material as claimed in claim 1, wherein said substantially amorphous polyolefin comprises the following monomer composition:

from 0 to 95% by weight of an α-olefin having 4 to 10 carbon atoms;

from 5 to 100% by weight of propene and from 0 to 50% by weight of ethene.

8. The molding material as claimed in claim 7, wherein said substantially amorphous polyolefin comprises the following monomer composition:

from 3 to 95% by weight of an α-olefin having 4 to 10 carbon atoms;

from 5 to 97% by weight of propene and from 0 to 20% by weight of ethene.

9. The molding material as claimed in claim 1, wherein said grafted, substantially amorphous polyolefin has a melt viscosity in the range from 1000 to 30,000 mPas.

10. The molding material as claimed in claim 1, wherein said reinforcing material selected from the group consisting of a filler, a fibrous reinforcing material and a mixture thereof.

11. The molding material as claimed in claim 1, which comprises from 4 to 200 parts by weight of said reinforcing material.

12. The molding material as claimed in claim 1, which comprises from 8 to 100 parts by weight of said reinforcing material.

13. The molding material as claimed in claim 10, which comprises either a fibrous reinforcing material or at least 28 parts by weight of a filler.

14. The molding material as claimed in claim 1, which comprises at least 28 parts by weight of said reinforcing material.

15. The molding material as claimed in claim 1, wherein said reinforcing material is selected from the group consisting of alumina, talc, barite, clay powder, silica, carbon black, calcium carbonate, titanium dioxide, mica, kaolinite, glass flakes, kieselguhr, glass beads, glass fibers, carbon fibers, single crystal filaments and a mixture thereof.

16. The molding material as claimed in claim 1, further comprising a crosslinking accelerator.

17. The molding material as claimed in claim 1, wherein said grafted, substantially amorphous polyolefin is crosslinked.

18. A process for the preparation of the molding material as claimed in claim 1, wherein said reinforcing material is incorporated into a melt of said grafted, substantially amorphous polyolefin.

19. The process for the preparation of the molding material as claimed in claim 1, wherein said reinforcing material is incorporated into a melt of said substantially amorphous polyolefin and grafting is then carried out by metering in said silane and a free radical donor.

20. The process for the preparation of the molding material as claimed in claim 1, wherein a mixture which is obtained as claimed in either of claims 18 and 19 is mixed with said thermoplastic or thermoplastics (component (a)).

21. The process as claimed in claim 20, wherein said thermoplastic is polypropylene.

22. The process for the preparation of the molding material as claimed in claim 1, wherein said grafted, substantially amorphous polyolefin contained in said molding material is crosslinked.

23. The process as claimed in claim 22, wherein crosslinking is carried out by means of water vapor from the surrounding air, by water vapor which is contained in a gas stream, by steam or hot water treatment or by water which is contained in said thermoplastic.

24. The process as claimed in either of claims 22 and 23, wherein crosslinking is carried out in a melt, in the granules or on a shaped article.

25. A shaped article comprising the molding material of claim 1.

26. A heavy-duty carpet backing material comprising a grafted, substantially amorphous polyolefin of a substantially amorphous polyolefin which has been subjected to free radical grafting with a silane which has at least one olefinic double bond and one to three alkoxy groups bonded directly to the silicon, wherein said grafted, substantially amorphous polyolefin has a melt viscosity at 190° C. in the range from 100 to 50,000 mPas and from 0.5 to 400 parts by weigh of a reinforcing material based on 100 parts by weight of polyolefin, with the exception of those carpet-backing materials in which less than 28 parts by weight of barite is used.

27. A hotmelt adhesive comprising a grafted, substantially amorphous polyolefin of a substantially amorphous polyolefin which has been subjected to free radical grafting with a silane which has at least one olefinic double bond and one to three alkoxy groups bonded directly to the silicon, wherein said grafted, substantially amorphous polyolefin has a melt viscosity at 190° C. in the range from 100 to 50,000 mPas and from 0.5 to 400 parts by weight of a reinforcing material based on 100 parts by weight of polyolefin, with the exception of those carpet-backing materials in which less than 28 parts by weight of barite is used.

28. A masterbatch for the preparation of reinforced thermoplastic comprising a grafted, substantially amorphous polyolefin of a substantially amorphous polyolefin which has been subjected to free radical grafting with a silane which has at least one olefinic double bond and one to three alkoxy groups bonded directly to the silicon, wherein said grafted, substantially amorphous polyolefin has a melt viscosity at 190° C. in the range from 100 to 50,000 mPas and from 0.5 to 400 parts by weight of a reinforcing material based on 100 parts by weight of polyolefin, with the exception of those carpet-backing materials in which less than 28 parts by weight of barite is used.

* * * * *